Jan. 3, 1956 P. L. TORRE 2,729,465
SPRINGING SYSTEM FOR A MOTORCYCLE WHEEL
Filed Nov. 13, 1952
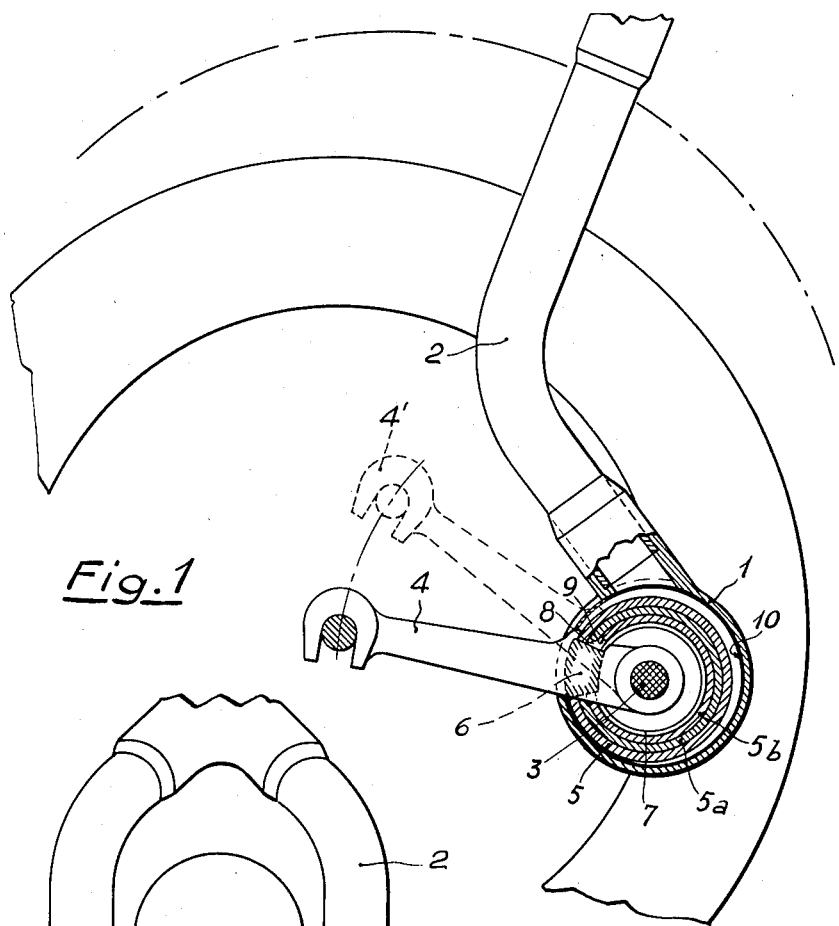
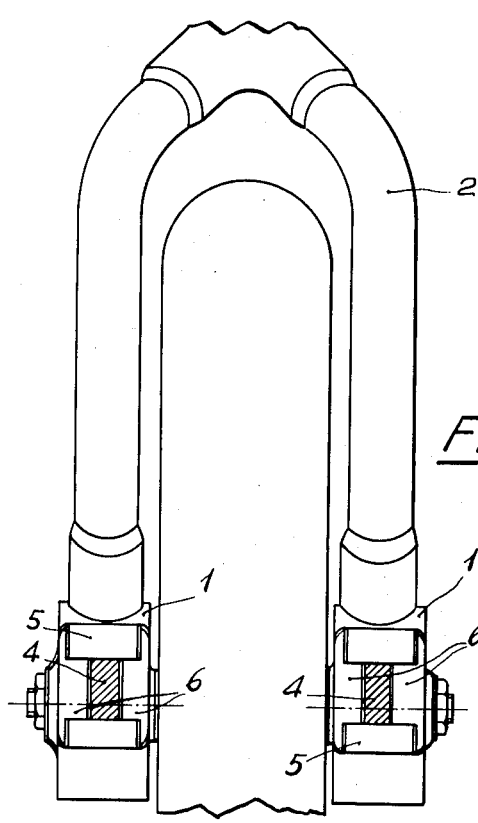
INVENTOR
PIER LUIGI TORRE
BY
ATTORNEYS

United States Patent Office 2,729,465
Patented Jan. 3, 1956

2,729,465

SPRINGING SYSTEM FOR A MOTORCYCLE WHEEL

Pier Luigi Torre, Milan, Italy

Application November 13, 1952, Serial No. 320,172

Claims priority, application Italy November 17, 1951

4 Claims. (Cl. 280—277)

The present invention relates to springing system for vehicle wheels and more particularly to springing suspension for the front wheel of motorcycles.

In the springing systems, and particularly those for the front wheels of motorcycles built up to the present, it has not been easy, without introducing excessive complications, to realise economical and uncumbersome solutions possessing at the same time a load diagram sufficiently progressive with the excursion. Besides, the systems in use up to the present do not offer a sufficient protection to the oxidating and abrasive action on the elastic organs of the suspension of mud projections or dust, and do not permit to keep in efficiency for any length of time, the initial lubrication of said organs.

These inconveniences are eliminated by the present invention with the advantage of a remarkable constructional simplicity.

The springing system that is an object of the present invention is characterised by the fact that the wheel carrying arms, that are articulated to the fork pivots, are braked during their springing excursion by an open ring system of springs, co-axial with the articulation pivots of the arms themselves. The springs are constituted by rectangular, or similarly shaped, flat steel blades, of suitable width and thickness, eventually variable along their length, and bear, with the side portions of their terminal sections corresponding to the open ring part, on radial expansions fixed to the casings and solid with the forks, while in the center portion of said terminal sections they come to bear onto the wheel carrying arms.

Thus, to the rotation of the arms under the action of the springing, will correspond a progressive expansion of the spring rings, inasmuch as the wheel carrying arms provoke the spreading out the open portion of the rings, the latter being held fast at the other end by the radial rests solid with the terminal fork casings.

The springs can vary in diameter and number and are concentrically arranged. It is possible to cause them to work progressively, by beginning the spreading out action by the outermost spring and successively engaging with an opportune delay those disposed progressively inside of the first one. It is thus possible to realise a variable flexibility diagram of the springing system, easily definable and readily modified as desired, this representing a very important characteristic in the motorcycle wheel suspension systems.

The adoption of the multiple spring system offers besides a greater safety in case of breakages in respect with the systems possessing a single elastic organ.

Another characteristic of the system in question is that there is no sudden shock during the return phase, as there is no lower travel stop and should the arms due to inertia travel too far, the elastic rings charge themselves again by spreading out: there will only be an inversion of the resting points of the spring ends, passing from the lower to the upper surface of the internal projections fixed to the terminal boses, whilst the point of action of the arms on the other end of the springs passes from the upper to the lower surface.

The limitation of the up stroke is caused by the fact that near the maximum expansion provided, the outermost ring shaped spring gradually adheres to the wall of the box that prevents any further dilatation of it. By suitably shaping the internal form of the box, or eventually providing it with a packing made of a somewhat resilient material like rubber or a plastic substance, or by both of these means, it is possible to further influence the load diagram and the rate of operation at the end of the travel.

The appended drawing schematically and by way of example illustrates a practical embodiment of the invention. In it, Fig. 1 is a partially sectioned side view of a suspension for a wheel of a motorcycle, provided with the springing system according to the invention;

Fig. 2 is a front view of the suspension of Fig. 1, in which the wheel carrying arms are sectioned.

As shown by the drawing, fork 2 sustaining the wheel, carries solid with each of its arms a casing 1 inside of which is arranged the respective pivot pin 3 of the arms 4 retaining the wheel. Concentrically with pivot pin 3 spring rings are arranged, in the case illustrated three in number, indicated by reference characters 5, 5a and 5b open at the portion corresponding to the entrance of arms 4 into boxes 1. Said rings are kept centered in the initial position by a circular projection 7 solid with casing 1. Also solid with each box 1 there are expansion joints 6 directed in a radial sense, one of which will normally be carried by the casing and the other by the cover of the casing itself. Said expansion joints are located in the zone corresponding to the path of arm 4 and are arranged, as clearly shown in Fig. 2, laterally to said arm. Elastic rings 5, 5a and 5b bear with their ends, in their lateral zones, against projections 6 and in their central zone onto the flat surface of the respective arm 4. While the cycle or motorcycle, of which a portion is shown on the drawing, is running arms 4 accomplish springing excursions, rotating around their respective pivots 3 (in Fig. 1 there is indicated a position that arm 4 can take) and during this movement they act upon the spring rings 5, 5a and 5b, in such a way as to provoke their opening by spreading outwards their extremities. It is clear that in such a way the excursions of arms 4 and therefore of the wheels are elastically hindered by the open and resilient rings 5, 5a and 5b, and, should these springs have properly been calculated, the desired springing action will be obtained; together with the above cited advantages.

In the return phase of arms 4, should after an excursion of the latter, the dead point have been surpassed on account of the inertia of the parts, the opening of said rings would again be solicited to increase by the action of the arms upon the other end of the rings and therefore the springing effect would be absolutely analogous to the preceding one.

To assure that rings 5, 5a and 5b come into action successively in order to get a more gradually resilient effect, the rings 5a and 5b for instance, will be provided with notches 8 and 9, and a corresponding pair of notches (not visible on the drawing), made on the ends of said rings, at the central part of their sections, with a width corresponding to that of the arms and having an increasing depth as illustrated in Fig. 1.

As already hinted at, the internal shape of casing 1 may be such as to assist the graduality of the end of the excursion that is realised when the outer ring 5 comes to bear against the cylindrical wall of the box. To this end the inner wall may be fitted with a plastic material layer 10 (see Figure 1) possessing convenient characteristics, which constitutes another advantageous possibility offered by this type of springing and that is not obtainable, on the contrary, with any other known type.

Of course, the number of the elastic rings, their dimensions as well as the shape and dimensions of the casing containing them and the constructional details of the fork, of the wheel-bearing arms and of all of the other organs hereinbefore cited, may vary according to necessity, without going, for this reason, outside of the field of the present invention.

What I claim is:

1. A system of springing for a vehicle wheel and particularly a motorcycle wheel comprising a resilient unit for each side of the vehicle wheel, said resilient unit having a plurality of split ring springs, a casing for each of the said resilient units secured to the vehicle frame and an arm on each side of said wheel for retaining said wheel, said springs being mounted in said casing coaxially with respect to the axis of rotation of said arm, said casing having internal projections against which rest the side portions of the terminal sections of said springs while the central portion of said terminal sections rest against said arm, said springs being constrained to spread out by the action of the said arm which when moving under the effect of road asperities will press against one end of said springs, the said springs of each of the said resilient units being so arranged so as to operate progressively beginning the spreading out action from the outermost one with the others in succession, each inner spring having a notch on a terminal side; said notch being located to obtain a delayed spring action, said notch being located at the center of the sections of said springs and having a width corresponding to the width of the said arms and having a gradual progressing depth in the various springs so as to bring about the progressive springing action desired.

2. A system of springing for a vehicle wheel and particularly a motorcycle wheel comprising a resilient unit for each side of the vehicle wheel, said resilient unit having a plurality of split ring springs, a casing for each of the said resilient units secured to the vehicle frame and an arm on each side of said wheel for retaining said wheel, said springs being mounted in said casing coaxially with respect to the axis of rotation of said arm, said casing having internal projections against which rest the side portions of the terminal sections of said springs while the central portion of said terminal sections rests against said arm, said springs being constrained to spread out by the action of the said arm which when moving under the effect of road asperities will press against one end of said springs, the said springs of each of the said resilient units being so arranged so as to operate progressively beginning the spreading out action from the outermost one with the others in succession, each inner spring having a notch on a terminal side; said notch being located to obtain a delayed spring action; said notch being located at the center of the sections of said springs and having a width corresponding to the width of the said arms and having a gradual progressing depth in the various springs so as to bring about the progressive spring action desired, the outer spring being engageable with the wall of the casing to increase the springing resistance.

3. A system of springing for a vehicle wheel and particularly a motorcycle wheel comprising a resilient unit for each side of the vehicle wheel, said resilient unit having a plurality of split ring springs, a casing for each of the said resilient units secured to the vehicle frame and an arm on each side of said wheel for retaining said wheel, said springs being mounted in said casing coaxially with respect to the axis of rotation of said arm, said casing having internal projections against which rest the side portions of the terminal sections of said springs while the central portion of said terminal sections rests against said arm, said springs being constrained to spread out by the action of the said arm which when moving under the effect of road asperities will press against one end of said springs, the inner surfaces of said casings housing the split ring springs having a layer of plastic material to dampen the shock at the end of the excursions of said arms and positioned between and engageable with the split ring springs and the casings.

4. A system of springing for a vehicle wheel and particularly a motorcycle wheel comprising a resilient unit for each side of the vehicle wheel, said resilient unit having a plurality of split ring springs, a casing for each of the said resilient units secured to the vehicle frame and an arm on each side of said wheel for retaining said wheel, said springs being mounted in said casing coaxially with respect to the axis of rotation of said arm, said casing having internal projections against which rest the side portions of the terminal sections of said springs while the central portion of said terminal sections rests against said arm, said springs being constrained to spread out by the action of the said arm which when moving under the effect of road asperities will press against one end of said springs, the said springs of each of the said resilient units being so arranged so as to operate progressively beginning the spreading out action from the outermost one with the others in succession, each inner spring having a notch on a terminal side; said notch being located to obtain a delayed spring action; said notch being located at the center of the sections of said springs and having a width corresponding to the width of the said arms and having a gradual progressing depth in the various springs so as to bring about the progressive spring action desired, the inner surface of the said casings housing the split ring springs having a layer of plastic material adapted to dampen the shock at the end of the excursions of said arms and positioned between and engageable with the split ring springs and the casings.

References Cited in the file of this patent

UNITED STATES PATENTS

| | | |
|---|---|---|
| 2,167,474 | Chudner | July 25, 1939 |
| 2,356,322 | Johnson | Aug. 22, 1944 |
| 2,376,788 | Latscher-Latka | May 22, 1945 |
| 2,534,248 | Danielsen et al. | Dec. 19, 1950 |
| 2,596,411 | Jordan | May 13, 1952 |

FOREIGN PATENTS

| | | |
|---|---|---|
| 636,972 | Germany | Oct. 20, 1936 |
| 749,038 | Germany | Dec. 9, 1944 |